June 8, 1954 A. L. W. WILLIAMS 2,680,613

DRIVE FOR MAGNETIC RECORD TRANSDUCING APPARATUS

Filed April 23, 1949 2 Sheets-Sheet 1

INVENTOR.

ALFRED L. W. WILLIAMS

BY Eber J. Hyde

ATTORNEY

June 8, 1954 A. L. W. WILLIAMS 2,680,613

DRIVE FOR MAGNETIC RECORD TRANSDUCING APPARATUS

Filed April 23, 1949 2 Sheets-Sheet 2

INVENTOR.
ALFRED L.W. WILLIAMS
BY
Eber J. Hyde
ATTORNEY

Patented June 8, 1954 2,680,613

UNITED STATES PATENT OFFICE 2,680,613

DRIVE FOR MAGNETIC RECORD TRANSDUCING APPARATUS

Alfred L. W. Williams, Cleveland Heights, Ohio, assignor, by mesne assignments, to Clevite Corporation, Cleveland, Ohio, a corporation of Ohio Application April 23, 1949, Serial No. 89,316

6 Claims. (Cl. 271—2.3)

This invention relates to drive arrangements for magnetic record transducing apparatus, particularly for use in such apparatus operating with a thin, flexible, magnetic record track which is reeled from one reel onto another reel.

This is a continuation in part of my application Serial No. 732,970, filed March 7, 1947 for Magnetic Transducing Apparatus, now U. S. Patent No. 2,643,071, and is a continuation in part of my application Serial No. 45,287, filed August 20, 1948 for Magnetic Recording and Reproducing.

Among the objects of the invention are the provision of novel drive arrangements for magnetic record transducing apparatus of the foregoing type, which are more effective in securing high quality, wow and flutter-free operation.

The foregoing and other features of the invention will be best understood from the following description of an exemplification thereof, reference being had to the accompanying drawings, wherein.

The apparatus of this invention is designed for use with a thin, flexible, reelable record member, such, for example, as a long, thin strip of paper or plastic on which there is a coating of permanently magnetizable powder particles uniformly dispersed in a bonding compound, or a long, thin strip of plastic material having dispersed in it the magnetizable powder material.

The record member is wound on a reel and is adapted to be driven by the record player mechanism past the transducer head and wound on a take-up reel, as is well known in the art.

Figures 1, 2:
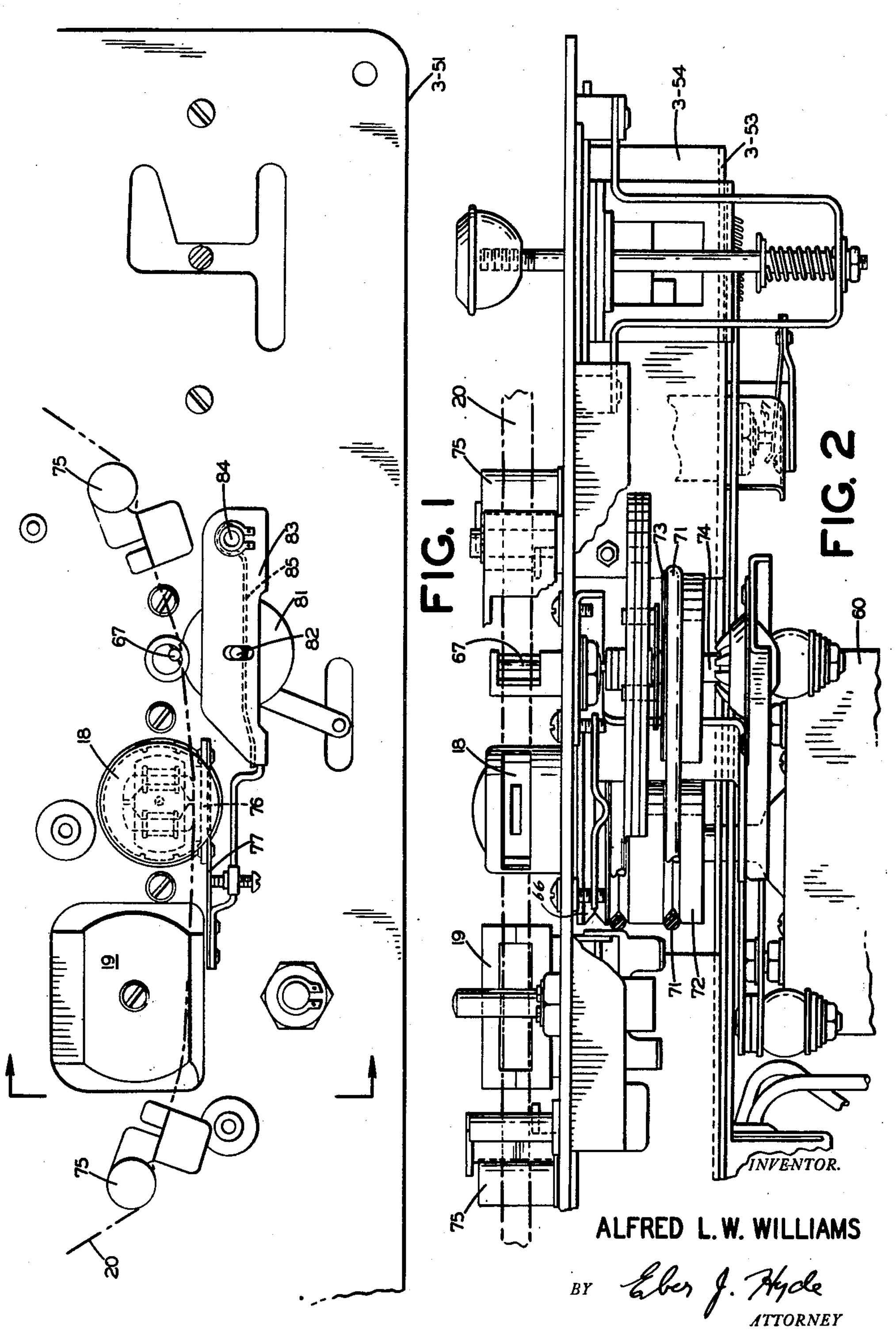
Fig. 1 is a plan view of a portion of a magnetic recorder-reproducer with cover plate removed to show the principal elements thereof.
Fig. 2 is an elevational view of the device shown in Fig. 1.
Figure 3:
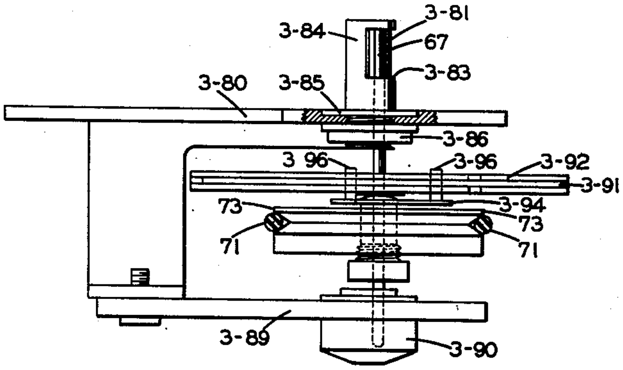
Fig. 3 is an elevational view of the capstan, flywheel and drive assembly, together with its supporting bracket structure.
Figure 4:
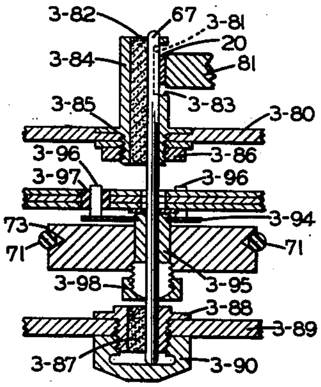
Fig. 4 is a vertical cross-sectional view taken along line 4—4 of Fig. 6.
Figure 5:
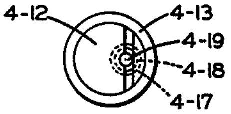
Fig. 5 is a plan view of the capstan shown in Fig. 3.

In the form of recording apparatus shown in the drawings, the record tape member 20 is arranged to be driven during a record transducing operation by a constant-speed capstan drive mechanism shown in detail in Figs. 3 to 5. In accordance with the invention, the capstan drive is formed of a thin, pin-like capstan shaft 67 having an elongated portion exposed along the transducing guide path of the record tape 20 and supported at least along one side of its length both above and below the drive portion engaged by the tape, so as to provide a self-aligning journalling support for the pin-like capstan shaft 67. The capstan pin 67 is rotated at desired speed through a drive belt 71 trained over a motor-pulley 72 affixed to a motor shaft, and a drive pulley 73 affixed to an extension 74 of the capstan shaft pin 67.

The exposed driving portion of the capstan shaft pin 67 is held positioned along a transducing guide path of the tape 20 defined by two guide posts 75 which have a highly polished exterior, and placed so that the tape impelled and guided by them will move with its magnetic record surface into engagement with the pole face region of the transducer head 18 and the erasing head 19 when the latter is brought from its normal retracted position to its operative position along the transducer guide path. In order to establish good coupling engagement between the successive magnetic surface elements of the moving record tape with the pole gap region of the magnetic transducer head 18, a flexible backing element 76 carried by an arm 77 is arranged to be brought against the extended back surface portion of the tape facing an extended pole face region separated by the pole gap, for securing good and positive contact engagement between the extensive pole faces bordering the gap and a continuous portion of the moving tape facing the same. This assures that the exposed magnetic record surface of the tape makes stable contact engagement with the edge regions of the pole faces bordering the tiny pole gap of only .0005 inch, and secures stable scanning of the successive portion of the record tape.

In order to assure that the driven portion of the record tape 20 is maintained in good driving engagement with the capstan pin shaft 67, there is provided a capstan coupling member 81, shown in the form of a revolvably mounted roller arranged to be moved from the retracted position shown to a coupling position wherein it presses the tape against the exposed surface portion of the capstan pin shaft 67. The capstan coupling roller 81 shown has a shaft 82 projecting therefrom into opposite guide slits of a coupling arm 83 pivotally mounted on a pivot post 84 of the frame structure. These elements are designed so that by swinging the arm 83 around its pivot toward the capstan pin 67 a peripheral portion of the backing roller 81 will automatically align itself with an elongated surface portion of the capstan shaft pin 67 for positively coupling into driving engagement therewith the full width of a portion of the moving tape passing therebetween. As indicated, a biasing spring 85 in the form of a looped spring wire, carried by the coupling lever 83 and having two arms engaging the ends of the journalling pin of the backing roller 81, urges it yieldably into a self-aligning coupling position against an elongated exposed surface portion of the capstan pin shaft 67.

In the arrangement shown, the coupling lever 83 is also utilized for supporting, as by another pin, the pivot end of the lever arm 77 carrying the backing element of the transducer head 18. The arm 77 may comprise a spring biased to yieldably press the backing pad 76 toward the pole gap region of the pole faces of the transducer head when the coupling lever 83 is actuated toward the coupling position from the normally retracted position.

The erasing head 19 may be of the permanent-magnet type, positioned for movement between an operative position along the transducing path of the tape 20 and a normal retracted position in which it is held by biasing means such as its own weight and the weight of its supporting structure or by a biasing spring.

As shown the recorder-reproducer uses a single electric drive motor 60 for selectively driving the two reels in opposite directions for reeling the record track tape 20 on either one of the two reels, and the same motor may be utilized to drive the capstan 67 at a desired constant speed by a belt coupling between a capstan drive pulley 72 on the motor shaft and the belt pulley 73 on the extension of the capstan 67. With such an arrangement, the capstan belt driving connection between the motor shaft pulley 72 and the capstan pulley 73 is designed to be substantially nonslipping, whereas the reel driving connections between the motor shaft of the drive motor 60 and the two reels are so designed as to permit relatively ready slippage of the respective reel holder relatively to its drive pulley 61. In fact, the reel drive slippage connection between the motor and the two reel holders is so designed as to impart to the reel a driving force just sufficient to reel thereon the record track tape 20 as it is advanced by the capstan while subjecting the tape to only negligibly small tension just sufficient to avoid excessive slack. It should be noted, however, that the reel drive arrangement described above is very effective in reeling the tape 20 on one or the other of the two reels at a desired high forward or backward speed whenever it is desired to transport the tape at a rapid rate from one reel to the other.

The frame structure of the apparatus comprises an upper main frame plate 3—51 upon which the two reel holders and associated mechanism are mounted. An additional frame plate 3—53 is secured, as by flanged side walls 3—54 to the main frame plate 3—51 at a distance below the upper frame.

The record transducing head 18 and the tape guide posts 75 are secured to the upper frame plate 3—51 to provide along its upper side a guide path along which the record tape 20 is guided past the pole faces of the transducer head 18 and the capstan 67 as the tape is reeled from one reel to the other.

The recording apparatus shown embodies a novel constant speed capstan drive. Prior art constant speed capstan drives for driving at a constant speed a record tape or the like, usually required a number of carefully machined parts. In most cases such prior constant speed drives required a carefully machined capstan roller, a carefully machined bearing for the capstan roller, a relatively heavy carefully balanced fly wheel mounted to revolve with the capstan roller, and accurately finished friction drive rollers having matched non-interchangeable friction members.

The capstan of this invention is made in the form of a relatively thin simple shaft arranged to revolve on a bearing support surface engaging only one elongated side thereof. The portions of the shaft capstan member which are engaged by the bearing support are substantially of the same diameter as the portions of the shaft capstan which are engaged by the record member driven thereby at a constant speed. Because of its relatively small diameter, the shaft capstan of the invention may be driven at a relatively high speed at which its small-diameter drive surface will drive the recording medium at the desired relatively low constant record speed. Because of its relatively high speed of rotation, a relatively small flywheel will be sufficient to provide for the desired suppression of flutter. In the capstan drive of the invention the only critical member which has to be carefully machined is the elongated shaft-like capstan member, the machining of which, by its very nature, is an extremely simple operation.

The capstan 67 has a form of a generally cylindrical elongated relatively thin shaft of small diameter having a driving portion 3—81 exposed along one side thereof for coupling engagement with a portion of the record tape 20 pressed against it by the coupling roller 81. Portions of the small diameter capstan shaft 67 having substantially the same diameter as its driving portion 3—81 are supported by an elongated bearing member 3—82 engaging only a part of the periphery of the shaft capstan 67 extending generally on the side opposite to the side having its exposed driving portion 3—81. In the form shown one elongated side of the bearing member 3—82 is provided with a bearing groove shaped to engage the elongated portions along the rear side of the bearing shaft 67 opposite to the side having its exposed driving portion 3—81. The elongated bearing seat groove of the bearing member may be either of a cylindrical shape conforming to the cylindrical shape of the shaft capstan 67 revolving thereon, or it may be of a V-shape, the sides of the V-shaped groove serving as a bearing support for the elongated rear side of the cylindrical capstan shaft 67. Commercially available self-lubricating solid bearing compositions, such as bricketed powdered bronze and graphite impregnated with an oily lubricant or bricketed powdered bronze and graphite by itself, have been found to be satisfactory for use as bearing members 3—82 for a capstan of the invention of the type shown.

The elongated bearing member 3—82 and the capstan 67 are maintained in their operative position within a bearing collar or sleeve 3—84 so that the shaft capstan 67 is retained in an eccentric position along the bearing surface of the bearing member 3—82 by a peripheral portion of the bearing sleeve 3—84. As indicated in Figs. 3 and 4, a window opening 3—83 provided in the bearing sleeve 3—84 exposes the driving portion 3—81 of the capstan for engagement with the record track 20 which is coupled thereto by the coupling pressure of the coupling roller member 81. The driving portion 3—81 of the capstan 67 with its bearing member 3—82 are supported in their operative position, by suitably securing them to an underlying rigid auxiliary mounting plate 3—80 by providing the bearing sleeve 3—84 with a seating flange 3—85 and a threaded end portion retained within a hole of the auxiliary mounting plate 3—80 by a nut 3—86 and an underlying locking washer. The auxiliary mounting plate 3—80 is in turn secured as by screws to the overlying main mounting plate 3—51 which is provided with opening portions through which the upper end of the capstan 67 and its bearing structure extend.

The thin shaft capstan 67 is shown combined with a novel fly wheel 3—91 which may be given the desired effective dynamic balance without careful machining. In accordance with the invention the fly wheel 3—91 is formed of a plurality of alike circular sheet members 3—92 each produced by identical operations from the same stock of sheet material, as by stamping or punching, and the individual circular sheet members 3—92 are secured to each other in angularly displaced overlapped relationship to form a unitary circular fly wheel in which the unbalancing elements of the different individual circular sheet members compensate each other to assure that the assembled circular fly wheel structure is dynamically balanced.

Figure 6:
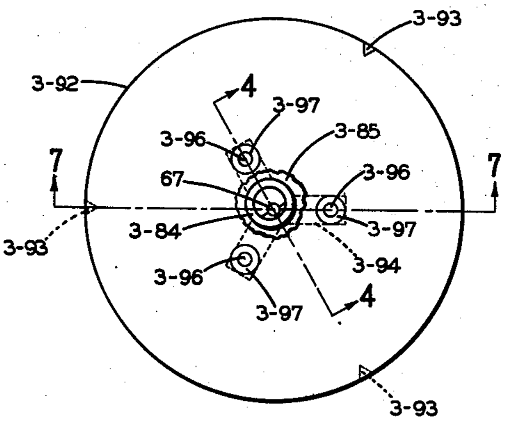
Fig. 6 is a plan view of the fly-wheel.
Figure 7:
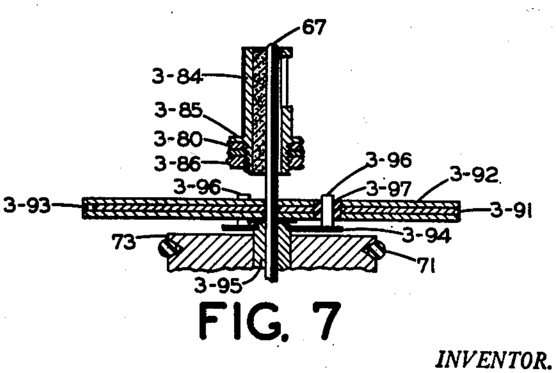
Fig. 7 is a sectional view taken along line 7—7 of Fig. 6.

In the particular fly wheel of the invention (shown in Figs. 3, 6 and 7) the composite fly wheel is made of three circular sheet members 3—92 united to each other in aligned position by three rivets extending through angularly displaced rivet holes formed in each of the sheet members. Each of the three circular sheet members is provided with an identical aligning mark such as a notch 3—93 on its periphery and the three sheets are assembled so that the peripheral notch marks 3—93 are displaced 120 degrees, and assure that with the notch marks 3—93 uniformly distributed around the periphery of the assembly fly wheel, the three rivet holes of each sheet member 3—92 will be aligned with each other and any unbalance of one sheet member will be compensated by corresponding unbalance in the other two sheet members.

Instead of three circular sheet members 3—92, two circular sheet members displaced 180 degrees relatively to each other may be used for producing the artificially balanced fly wheel of the invention. In general, any multiple number of circular sheet members may be combined into a balanced fly wheel of the invention of the type described above as long as such fly wheel structure is composed of one or more sets of circular sheet members, each set of sheet members having a plurality of alike sheet members relatively to each other by an angle equal to 360 degrees divided by the number of alike sheet members in the set.

The circular fly wheel 3—91 is provided with a center hole which is somewhat larger than the shaft capstan 67 and is connected to the capstan by a flexible connector structure which secures fully effective rotational torque transmission between the fly wheel 3—91 and the shaft capstan 67 while permitting the fly wheel to assume a self-centering axial position with respect to the shaft in which it is dynamically balanced and causes the shaft capstan to rotate at a desired constant speed.

In the form shown the self-centering connection between the capstan shaft 67 and the fly wheel 3—91 is provided by three spring arms 3—94, 120 degrees displaced and radially extending from a collar 3—95 affixed to the shaft capstan 67. The outer ends of the collar spring arms 3—94 are provided with coupling pins 3—96 seated within sleeves 3—97 of elastomer material such as rubber held in three 120 degree displaced circular holes of the fly wheel structure 3—91 to provide a slightly yielding self-aligning torque-transmitting connection between the coupling pins 3—96 and the fly wheel 3—91. Such spring coupling connection secures an effective torque transmission between the fly wheel structure 3—91 and the capstan shaft 67 while permitting the fly wheel structure to align itself in dynamically balanced coaxial position with respect to the capstan shaft 67.

The coupling collar 3—95 may be affixed as by a pressfit to the shaft capstan 67 or as shown it may be affixed thereto by subdividing a threaded, slightly tapered portion thereof into a plurality of tongues which are tightened as by a nut 3—98 to the extension 74 of the shaft capstan 67.

In the particular capstan arrangement shown in Figs. 3 and 4 the coupling collar 3—95 is part of the drive pulley 73 which is utilized to drive the capstan shaft 67 at the desired speed by a belt 71 engaging the grooved periphery of the drive pulley.

A shaft capstan 67 may readily be made of a diameter sufficiently small for impelling the record track at a desired slow speed of only three inches per second, for instance, with a conventional small alternating current 60-cycle motor having a drive shaft mounted coaxially with the shaft capstan 67 and connected thereto through a vibration suppressing coupling connection such as a sleeve of rubber or like elastomer material.

In applications in which a shaft capstan 67 is driven by a drive pulley such as pulley 73 mounted thereon, an additional bearing support may be provided for the end portion of the capstan shaft 67 extending beyond the drive pulley 71. As shown in Fig. 4, the additional bearing member 3—87 engaging the lower end of the capstan, is held in its operative position by an encircling flanged collar 3—88 secured by a nut 3—90 within the circular mounting hole through the bracket plate 3—89 which is rigidly mounted in spaced relation to the mounting plate 3—80 of the capstan assembly.

Figure 8:
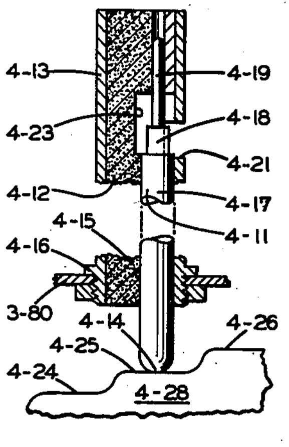
Fig. 8 is a sectional view of a modified form of capstan.

In accordance with the invention, a shaft capstan arrangement of the type desired above is provided with a plurality of distinct driving portions of different diameters to each of which the record track to be driven may be coupled by a coupling member, such as a coupling roller of the type described above. Fig. 8 shows how the capstan drive arrangement previously described may be modified for driving a record track at any one of a plurality of different speeds. The capstan drive of Fig. 8 comprises a shaft capstan 4—11, having an elongated side engaged by an elongated bearing member 4—12 both being held in their operative position within an encircling collar sleeve 4—13, secured to a frame plate 3—80 as in the arrangement of Figs. 3, and 4.

The shaft capstan 4—11 of Fig. 8 is also provided with a fly wheel and a drive pulley (not shown) generally similar to those of Figs. 3 and 4. The lower end portion 4—14 of the shaft capstan 4—11 projecting beyond the fly wheel has an elongated side thereof seated in a bearing member 4—15 held in operative position by a collar 4—16 secured by a nut within an opening of the frame bracket 3—80, as shown. The upper end of the shaft capstan 4—11 has three drive surface portions, 4—17, 4—18, 4—19 of different diameters arranged so that by slidable movement of the shaft capstan 14 along its bearing surfaces, either one of the three drive portions 4—17, 4—18, 4—19 may be brought opposite a window opening 4—21 of the mounting collar 4—13 for coupling thereto the record track tape 20 by a coupling member such as a coupling roller 81 in the manner described in connection with Figs. 3 and 4.

In the particular shaft capstan structure of Fig. 8, the drive portion 4—17 which is of the largest diameter and will drive the record track at the greatest speed is of the same diameter as the main length of the shaft capstan. The other drive portions 4—18, 4—19 of the shaft capstan are of successively smaller diameter and coaxial with the main length of the shaft capstan 4—11 and they may be machined in successive steps of a machining operation carried out in a single machine with the shaft held in the same support. In the particular arrangement shown, the lateral bearing support member 4—12 is provided with bearing portions engaging the drive portion 4—19 of the smallest diameter and apart of the main length of the capstan having the largest diameter. Since in most practical magnetic recorders a standard tape about ¼ inch in width is used, the unsupported drive portion of the capstan shaft of the type shown needs to have an overall length of only slightly more than ½ inch.

It is in general desirable that the drive portions of the shaft capstan to which the record tape 20 is coupled by the external coupling roller 81 should be free from engagement with the supporting bearing member such as the bearing member 4—12 of Fig. 8 and the bearing member 3—82 of Fig. 3. Accordingly, as shown in Fig. 8, the portion of the bearing surface of the bearing member 4—12 of Fig. 8 facing the tape coupling window 4—21 may be provided with a recess or depression 4—23 along its bearing surface to assure that the drive portion of the shaft capstan which drives the record tape is free from engagement with the bearing surface of the bearing member 3—82 and does not pick up from it, lubricant that might be transferred to the record track. A similar bearing member recess may be provided in the portion of the bearing member 3—82 of Figs. 3, 4, facing the coupling portion of the shaft capstan 67.

A setting member 4—28 provided with a camlike setting surface with three surface levels 4—24, 4—25, 4—26 is arranged to be selectively brought, as by a suitably mounted setting lever, into bearing engagement with the lower spherically rounded end 4—14 of the shaft capstan 4—11, and raise or lower the shaft capstan along the grooved bearing surface of its bearing member 4—12 to selectively bring one of the different driving portions 4—17, 4—18, 4—19 of the capstan 4—11 into its operative track-coupling position opposite the coupling opening 4—12 through which the record track 20 coupled thereto will be impelled at one of the different desired speeds. Such a selectively settable capstan shaft having a plurality of drive portions of different diameter to selectively impel the magnetic record track tape at different constant speeds greatly simplifies the construction of different speed magnetic tape recorders. For example, if the magnetic tape recorder is to be used for recording and playing back radio broadcasts picked up by an average quality radio receiver, operating with a good frequency response up to about 6,000 cycles per second, it is sufficient to impel the record track tape at a speed of only about 7 inches per second. Where the same magnetic recorder is to be used for recording and playing back programs of a much higher quality, for instance, with a good frequency response up to 12,000 cycles or more and a signal to noise ratio of about 60 db, the record track tape has to be impelled at a suitable correspondingly higher constant speed, for instance, 18 inches per second. On the other hand, if the same magnetic tape recorder is to be used for recording conference proceedings of long duration with average speech quality, it is sufficient to impel the record tape at a speed of only about 3 inches.

The setting member 4—28 and its setting surfaces 4—24, 4—25 and 4—26 may be made of the same material and in the same manner as ball bearing races, since the revolving spherical end portion 4—14 of the shaft capstan 4—11 operates effectively as a ball member.

Alternatively, the collar member 4—16 of the lower bearing member 4—15 of the shaft capstan of Fig. 8, may be arranged to be slidably mounted within another fixed guide collar secured to the supporting frame bracket member 3—80. Such slidingly mounted bearing collar member of the lower bearing is provided at its lower end with a cup shaped closure similar to the nut closure 3—90 of the lower bearing member shown in Fig. 4. The end closure of such modified construction is provided with a pin-like projection similar to the lower end 4—14 of the capstan shaft 4—11 for cooperation with the different cam surface levels 4—24, 4—25, 4—26 of the level setting member 4—28 so that the lower bearing member and the capstan shaft revolving therein may be brought to different desired levels in accordance with desired setting of the driving portions 4—17, 4—18, 4—19 of the capstan shaft. The weight of the shaft capstan 4—11 with the elements carried thereby is sufficient to cause it to remain slidably biased into engagement with the different bearing surfaces of the setting member 4—28 in all of its settings. If required, additional biasing means, such as a coil spring capstan applied to the upper end of the shaft capstan or an internal element thereof, such as the drive pulley, may be provided for this purpose. If the shaft capstan 4—11 is directly driven by a coaxially mounted motor shaft the setting cam member 4—28 may be combined in an obvious manner with an intermediate dynamically balanced follower collar affixed to the shaft and having a follower portion engaging the setting cam surface 4—24, 4—25, 4—26 for slidably moving the shaft capstan 4—11 to the desired different position.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for transducing signals on at least one elongated reelable permanently magnetizable record track having an intermediate track portion extending along a predetermined guide path, the combination of: guide means including impelling means arranged to guide and impel said track along said guide path past a magnetic record transducing head; said guide means including a power-energizable revolvably mounted generally-cylindrical shaft-like drive member arranged to be driven at substantially constant speed and having a coupling portion with an arcuate coupling surface exposed along said guide path to coupling engagement with said record track; a coupling roller positioned opposite said coupling surface for coupling thereto a portion of the record track guided along said guide path; and a bearing member having an elongated groove facing and engaging the side of said drive member opposite the side having said coupling surface for revolvably supporting said drive member, said bearing-engaged portions of said drive member being of a diameter substantially equal to or smaller than the diameter of the coupling roller.

2. In a magnetic record transducing apparatus for transducing signals on at least one elongated reelable permanently magnetizable record track having an intermediate track portion extending along a predetermined guide path, the combination of: guide means including impelling means arranged to guide and impel said track along said guide path past a magnetic record transducing head; said guide means including a power-energizable revolvably mounted generally-cylindrical shaft-like drive member arranged to be driven at substantially constant speed and having a coupling portion with an arcuate coupling surface exposed along said guide path to coupling engagement with said record track; a coupling roller positioned opposite said coupling surface of said drive member for coupling thereto a portion of the record track guided along said guide path; and a bearing member revolvably supporting said drive member and having portions engaging and supporting said drive member at an axial location directly opposite that of said coupling roller.

3. In a magnetic record transducing apparatus including a record track, the combination of: guide means including impelling means to guide and impel said record track along a path past a transducing head including a shaft-like drive member having an exposed coupling portion along said path; motor means for rotating said drive member at substantially constant speed; a coupling roller movably mounted at a position opposite said coupling portion; means for moving said coupling roller into engagement with said record member and said record member into engagement with the coupling portion of said drive member to couple said record member to said drive member; an elongated bearing member engaging said drive member on the side opposite its said coupling portion and over a length at least equal to the width of said coupling roller; said bearing engaged portion of said drive member being of a diameter smaller than the diameter of said coupling roller.

4. In a magnetic record transducing apparatus including a record track, the combination of: a bearing sleeve having a coupling opening, an elongated bearing member positioned in said sleeve and having an elongated groove extending lengthwise thereof, an elongated drive member extending along said groove and having a coupling portion located at and exposed by said coupling opening in said bearing sleeve, a coupling roller movably mounted with respect to said bearing sleeve at a position opposite said coupling opening, and means for moving said coupling roller toward said drive member to pinch said record member between said drive member and said coupling roller.

5. A magnetic record transducing apparatus as set forth in claim 3, further characterized by said elongated bearing member being formed of self-lubricating material.

6. A magnetic record transducing apparatus as set forth in claim 4, further characterized by said elongated bearing member being formed of self-lubricating material.

References Cited in the file of this patent

UNITED STATES PATENTS

| Number | Name | Date |
|---|---|---|
| 1,780,681 | Kellogg | Nov. 4, 1930 |
| 1,879,573 | Sponable | Sept. 27, 1932 |
| 1,933,336 | Peterman | Oct. 31, 1933 |
| 1,994,017 | Dirkes et al. | Mar. 12, 1935 |
| 2,033,277 | Elmer et al. | Mar. 10, 1936 |
| 2,069,841 | Massoneau | Feb. 6, 1937 |
| 2,361,752 | Eilenberger | Oct. 31, 1944 |
| 2,361,753 | Eilenberger | Oct. 31, 1944 |
| 2,369,017 | Camras | Feb. 6, 1945 |
| 2,385,863 | Kellogg(B) | Oct. 2, 1945 |
| 2,418,543 | Camras | Apr. 8, 1947 |
| 2,428,002 | Barrett | Sept. 30, 1947 |
| 2,450,701 | Wahlbert et al. | Oct. 5, 1948 |
| 2,463,411 | Mynard | Mar. 1, 1949 |
| 2,475,743 | Haringx | July 12, 1949 |
| 2,477,146 | Scherbatskoy | July 26, 1949 |
| 2,484,446 | Capstaff | Oct. 11, 1949 |
| 2,499,699 | Tinkham | Mar. 7, 1950 |
| 2,512,735 | Beier | June 27, 1950 |